United States Patent
Lucas

(10) Patent No.: US 9,132,910 B2
(45) Date of Patent: Sep. 15, 2015

(54) METHOD FOR ATTACHING A COMPONENT TO AN INTERNAL PORTION OF AN AIRCRAFT FUSELAGE

(75) Inventor: Michael Eugene Lucas, Bluffton, SC (US)

(73) Assignee: Gulfstream Aerospace Corporation, Savannah, GA (US)

( * ) Notice: Subject to any disclaimer, the term of this patent is extended or adjusted under 35 U.S.C. 154(b) by 240 days.

(21) Appl. No.: 13/396,215

(22) Filed: Feb. 14, 2012

(65) Prior Publication Data

US 2013/0205570 A1   Aug. 15, 2013

(51) Int. Cl.
*E04B 1/90* (2006.01)
*B64C 1/40* (2006.01)
*B23P 19/10* (2006.01)
*F16B 5/06* (2006.01)

(52) U.S. Cl.
CPC ............... *B64C 1/403* (2013.01); *B23P 19/10* (2013.01); *B23P 2700/01* (2013.01); *F16B 5/0692* (2013.01); *Y10T 29/49826* (2015.01); *Y10T 29/49895* (2015.01)

(58) Field of Classification Search
CPC ...... B23P 19/04; B23P 19/01; B23P 2700/01; B21J 15/142; E04B 2001/8263; B60R 13/0206; F16B 5/128; F16B 5/065; F16B 5/06; F16B 21/02; F16B 21/20; F16B 21/18; F16B 5/0621; B64C 1/403
USPC ......... 29/423, 432, 464, 428, 525.01, 525.02, 29/525.03, 525.04, 525.11; 181/284; 24/297; 244/129.1, 131, 171.7; 248/68.1, 65; 296/39.3; 411/337, 338
See application file for complete search history.

(56) References Cited

U.S. PATENT DOCUMENTS

| | | | | |
|---|---|---|---|---|
| 3,238,835 A | * | 3/1966 | Rosenberg | 411/338 |
| 3,545,708 A | * | 12/1970 | Gross | 248/74.3 |
| 4,002,092 A | * | 1/1977 | Smith et al. | 83/55 |
| 5,756,942 A | | 5/1998 | Tanaka et al. | |
| 6,358,591 B1 | | 3/2002 | Smith | |

(Continued)

OTHER PUBLICATIONS

PCT Search Report and Written Opinion mailed Apr. 16, 2013 in PCT/US2013/025152.

(Continued)

*Primary Examiner* — David Bryant
*Assistant Examiner* — Jun Yoo
(74) *Attorney, Agent, or Firm* — Ingrassia, Fisher & Lorenz, P.C.

(57) ABSTRACT

A method for attaching a component to an internal portion of an aircraft fuselage is disclosed herein. The method includes mounting a vibration isolator assembly to the internal portion of the aircraft fuselage. The vibration isolator assembly has a protruding engagement portion having a flange. The method further includes defining an opening in a vibration-deadening body. The method further includes positioning the vibration-deadening body over the vibration isolator such that the protruding engagement portion is received within the opening. The method further includes pressing a retaining member onto the protruding engagement portion such that the retaining member engages the flange. The retaining member will retain a portion of the vibration-deadening body below an end of the protruding engagement portion. The method still further includes attaching the component to the protruding engagement portion.

11 Claims, 11 Drawing Sheets

(56) References Cited

U.S. PATENT DOCUMENTS

| | | |
|---|---|---|
| 6,622,390 B2 | 9/2003 | Brusius |
| 7,967,535 B2 | 6/2011 | Eiserer et al. |
| 2006/0284014 A1 | 12/2006 | Muller et al. |
| 2009/0226663 A1 | 9/2009 | Hutter, III |
| 2010/0294896 A1 | 11/2010 | Sayilgan |

OTHER PUBLICATIONS

International Searching Authority, PCT International Search Report and Written Opinion mailed Apr. 16, 2013 in PCT/US2013/025152.

The International Bureau of WIPO, International Preliminary Report on Patentability for International Application No. PCT/US2013/025152, mailed Aug. 28, 2014.

\* cited by examiner

METHOD FOR ATTACHING A COMPONENT TO AN INTERNAL PORTION OF AN AIRCRAFT FUSELAGE

TECHNICAL FIELD

The technical field generally relates to aircraft and more particularly relates to a method for attaching a component to an internal portion of an aircraft fuselage.

BACKGROUND

A conventional passenger aircraft includes a fuselage, a cabin interior attached to and/or supported by the fuselage, and a sound-deadening blanket positioned in between the fuselage and the cabin. As the aircraft is flown, the fuselage interacts with the atmosphere. This interaction generates vibration which, if left unchecked, will be perceived by occupants of the aircraft as sound, which is undesirable. A sound-deadening blanket is used to suppress the radiation of sound into the cabin. The sound-deadening blanket is positioned to intercept the radiating vibrations and is configured to suppress the vibrations that radiate from the fuselage towards the cabin.

The aircraft's cabin is constructed of multiple discrete components that, when assembled together, form the walls, floors, and other structural elements that are visible to a passenger on board the aircraft. The many discrete components of the cabin are attached to the fuselage via multiple attachment components. In the absence of any precautions, the multiple attachment components would form a structural pathway for the transmission of vibration from the fuselage into the cabin. To inhibit the transmission of vibration from the fuselage into the cabin via the attachment components, the attachment components conventionally comprise vibration isolators. The vibration isolators include a flexible material that is positioned in the pathway of the vibrations as they travel from the fuselage towards the cabin. The flexible material is configured to absorb or block the vibrations and to thereby inhibit the vibrations from entering the cabin where they could be perceived as sound.

The vibration isolators and the sound-deadening blanket compete for the same space in between the fuselage and the cabin. In order to accommodate the vibration isolators, one conventional solution has been to cut relatively large openings in the sound-deadening blanket at locations that corresponds with the positions of the vibration isolators. These relatively large openings, however, provide an unobstructed pathway for sound to radiate from the fuselage to the cabin.

To address this concern, manufacturers have conventionally taken one of two courses of action. Some manufacturers have cut circular holes in the sound-deadening blanket that are sized to receive the entire vibration isolator. Once the sound-deadening blanket is positioned over the vibration isolator, a worker will seal off each hole by taping the periphery of each hole to either the vibration isolator or to some other structural component. This, in effect, closes off the pathway between the fuselage and the cabin. Other manufacturers have taken a different path. Instead of cutting a circular hole in the sound-deadening blanket, a worker will cut a slit in the sound-deadening blanket and will then press the sound-deadening blanket against the vibration isolator until the vibration isolator protrudes through the slit. The slit in the sound-deadening blanket will naturally form fit around the vibration isolator and will therefore leave only a minimal pathway for the transmission of radiated sounds.

While the above described solutions are adequate, there is room for improvement. For example, sealing the periphery of each hole with tape is a labor intensive process that consumes the worker's time and causes the manufacturer to incur additional cost (e.g., the cost of the tape). While cutting a narrow slit through the sound-deadening blanket avoids the cost and labor associated with using tape to seal circular openings, the failure to tape the ends of the slit to the vibration isolator (or to some other structure) creates the risk that the periphery of the slit will move into a position that obstructs the mounting aperture of the vibration isolator. This, in turn, may interfere with attempts by a worker to engage the mounting aperture of the vibration isolator when attaching the components of the cabin to the fuselage.

Accordingly, it is desirable to provide a method for attaching a component to the fuselage of the aircraft that permits the sound-deadening blanket to closely conform to the vibration isolator while minimizing the labor associated with the task. In addition, it is desirable to provide a method for attaching a component to the fuselage of the aircraft that inhibits the sound-deadening blanket from obstructing the mounting aperture of the vibration isolator. Furthermore, other desirable features and characteristics will become apparent from the subsequent summary and detailed description and the appended claims, taken in conjunction with the accompanying drawings and the foregoing technical field and background.

SUMMARY

A method for attaching a component to an internal portion of an aircraft fuselage is disclosed herein.

In a first non-limiting embodiment, the method includes, but is not limited to, mounting a vibration isolator assembly to the internal portion of the aircraft fuselage. The vibration isolator assembly has a protruding engagement portion having a flange. The method further includes, but is not limited to, defining an opening in a vibration-deadening body. The method further includes positioning the vibration-deadening body over the vibration isolator such that the protruding engagement portion is received within the opening. The method further includes, but is not limited to, pressing a retaining member onto the protruding engagement portion such that the retaining member engages the flange. The retaining member is configured to retain a portion of the vibration-deadening body below an end of the protruding engagement portion. The method still further includes, but is not limited to, attaching the component to the protruding engagement portion.

In another non-limiting embodiment, the method includes, but is not limited to, mounting a vibration isolator assembly to the internal portion of the aircraft fuselage. The vibration isolator assembly has a protruding engagement portion having a flange. The method further includes, but is not limited to, attaching an alignment spike to the protruding engagement portion. The method further includes, but is not limited to, pressing a vibration-deadening body against the alignment spike. The method further includes, but is not limited to, defining an opening in the vibration-deadening body proximate the alignment spike. The method further includes, but is not limited to, positioning the vibration-deadening body over the vibration isolator such that the protruding engagement portion is received within the opening. The method further includes, but is not limited to, removing the alignment spike. The method further includes, but is not limited to, pressing a retaining member onto the protruding engagement portion such that the retaining member engages the flange. The retaining member is configured to retain a portion of the vibration-deadening body below an end of the protruding engagement portion. The method still further includes, but is not limited to, attaching the component to the protruding engagement portion.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or the following detailed description.

A method for attaching a component, such as, but not limited to, a wall, a floor, or another structural component of an aircraft cabin to the internal portion of an aircraft fuselage is disclosed herein. The method entails the use of a vibration isolator assembly having a protruding engagement portion. The protruding engagement portion may include, but is not limited to, a threaded inner diameter to receive a threaded fastener which may be used to secure the component to the vibration isolator. In addition, the protruding engagement portion includes, but is not limited to, a flange projecting outwardly from the protruding engagement portion. This flange is configured to engage a retaining member, such as a disc, as described below.

The method includes, but is not limited to, mounting the vibration isolator assembly to the aircraft fuselage, cutting a relatively small opening in a vibration-deadening body, positioning the relatively small opening over the vibration isolator assembly, pushing a retaining member against the vibration-deadening body at a location that corresponds with the vibration isolator assembly, engaging the flange with the retaining member, which will retain the vibration-deadening body below an end of the vibration isolator assembly, and then attaching the component to the vibration isolator assembly. This method has at least one advantage of providing a relatively small opening in the vibration-deadening body which, in turn, permits a close and/or tightly fitting arrangement between the vibration-deadening body and the vibration isolator's protruding portion. This, in turn, minimizes the unobstructed pathway available to sound radiating from the fuselage towards the cabin. Use of the retaining member, which engages the flange on the protruding engagement portion, retains the vibration-deadening blanket below the opening of the protruding engagement portion. In this manner, the retaining member helps to ensure that the vibration-deadening body is kept clear of the opening of the protruding engagement portion.

A greater understanding of the method described for attaching a component to an internal portion of an aircraft fuselage may be obtained through a review of the illustrations accompanying this application together with a review of the detailed description that follows.

Figure 1:
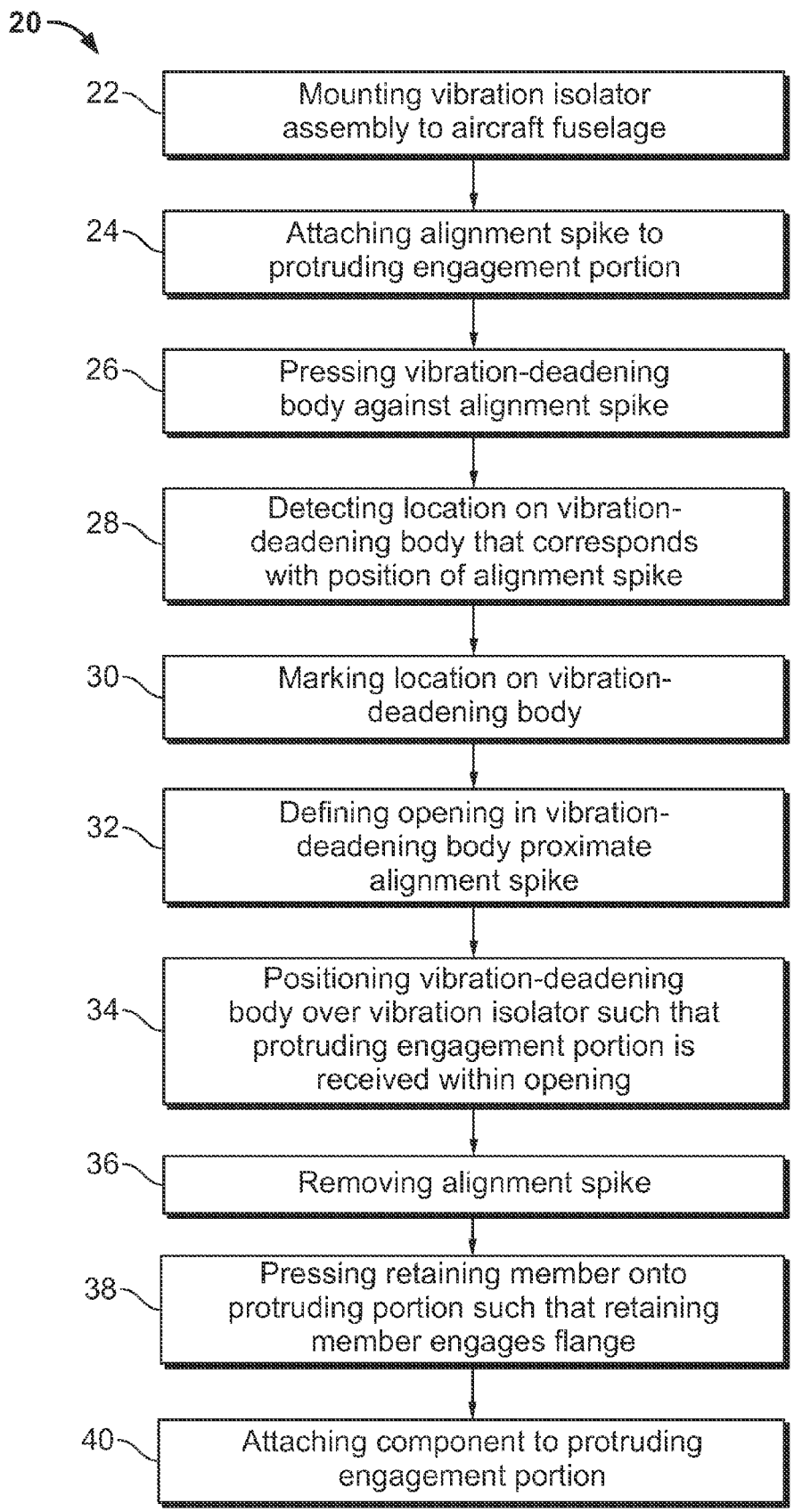
FIG. 1 is a block diagram illustrating a non-limiting embodiment of a method for attaching a component to an internal portion of an aircraft fuselage.

FIG. 1 is a block diagram illustrating a non-limiting embodiment of a method 20 for attaching a component to an internal portion of an aircraft fuselage. Blocks 22-40 of method 20 summarize each step of method 20. It should be understood that in other embodiments, method 20 may include either a lesser number of steps or a greater number of steps than those illustrated in blocks 22-40 without departing from the teachings of the present disclosure. It should also be understood that the steps of method 20 need not be performed in the sequence depicted at blocks 22-40. The discrete steps of method 20 are illustrated in FIGS. 2-15.

Figure 2:
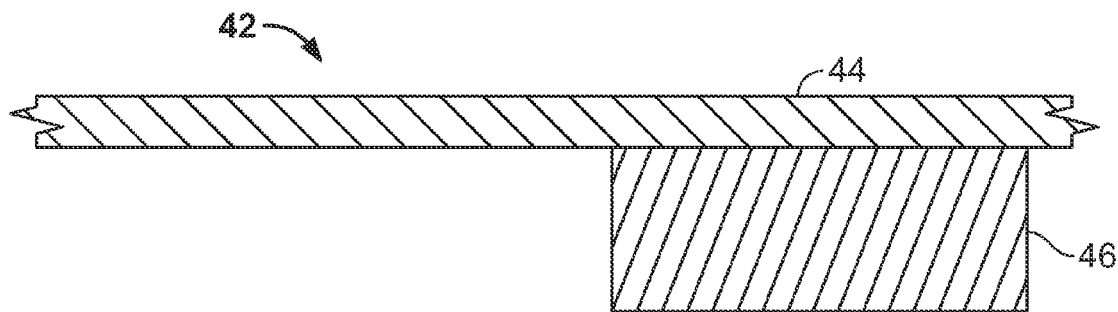
FIG. 2 is a fragmented schematic cross-sectional view illustrating a portion of an aircraft fuselage.
Figure 3:
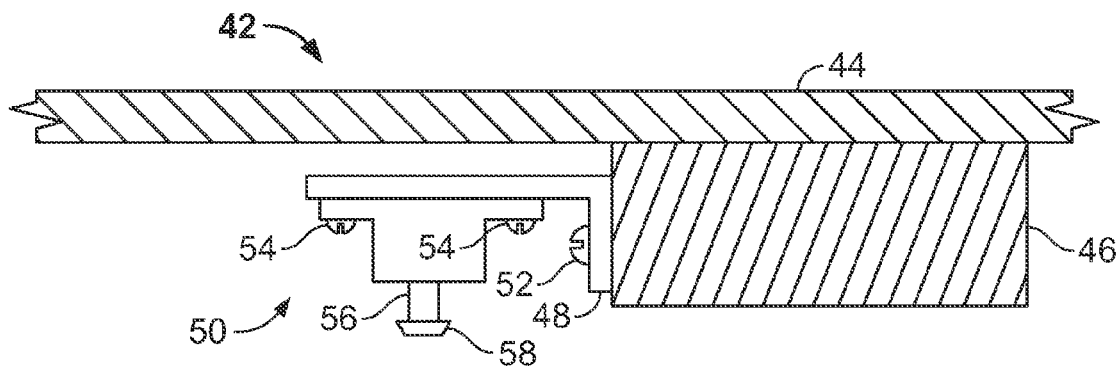
FIG. 3 is a schematic view illustrating a vibration isolator assembly attached to the portion of the aircraft fuselage illustrated in FIG. 2.

At block 22, and also with reference to FIGS. 2 and 3, a vibration isolator assembly is mounted to an internal portion of an aircraft fuselage. As illustrated in FIG. 2, a fragmented portion of a fuselage 42 is depicted in cross-section. Fuselage 42 includes, but is not limited to, an outer skin 44 and a brace 46. Outer skin 44 forms the periphery of the aircraft and brace 46 forms an inner support structure that supports an inner periphery of outer skin 44. As illustrated in FIG. 3, a mounting bracket 48 has been attached to brace 46 and a vibration isolator assembly 50 has been attached to mounting bracket 48. In other embodiments, vibration isolator assembly 50 may be attached directly to outer skin 44 or to brace 46 without an intervening mounting bracket.

In the embodiment illustrated in FIG. 3, mounting bracket 48 has been attached to brace 46 via a threaded fastener 52 and vibration isolator assembly 50 has been attached to mounting bracket 48 by threaded fasteners 54. It should be understood that the method disclosed herein does not require the use of threaded fasteners to effect these attachments, but rather any suitable method or mechanism for attaching mounting bracket 48 to brace 46 and for attaching vibration isolator assembly 50 to mounting bracket 48 may be employed.

As illustrated in FIG. 3, vibration isolator assembly 50 includes, but is not limited to, a protruding engagement portion 56 that extends outwardly from vibration isolator assembly 50. In the illustrated embodiment, protruding engagement portion 56 is a generally cylindrical component having a threaded inner diameter to receive threaded fasteners. In other embodiments, protruding engagement portion 56 need not be cylindrical, but rather, may have any suitable shape and/or configuration. By providing protruding engagement portion 56 with a threaded inner diameter, threaded fasteners may be used to secure components such as wall segments, floor segments, and other aircraft cabin components to vibration isolator assembly 50.

As illustrated in FIG. 3, protruding engagement portion 56 includes a flange 58 located at an end of the protruding engagement portion 56. In other embodiments, flange 58 may be positioned at a location that is spaced apart from the end of protruding engagement portion 56. Flange 58 is configured to engage a retaining member (not shown in FIG. 3), and to thereby secure the retaining member to vibration isolator assembly 50, as discussed in greater detail below.

Figure 4:
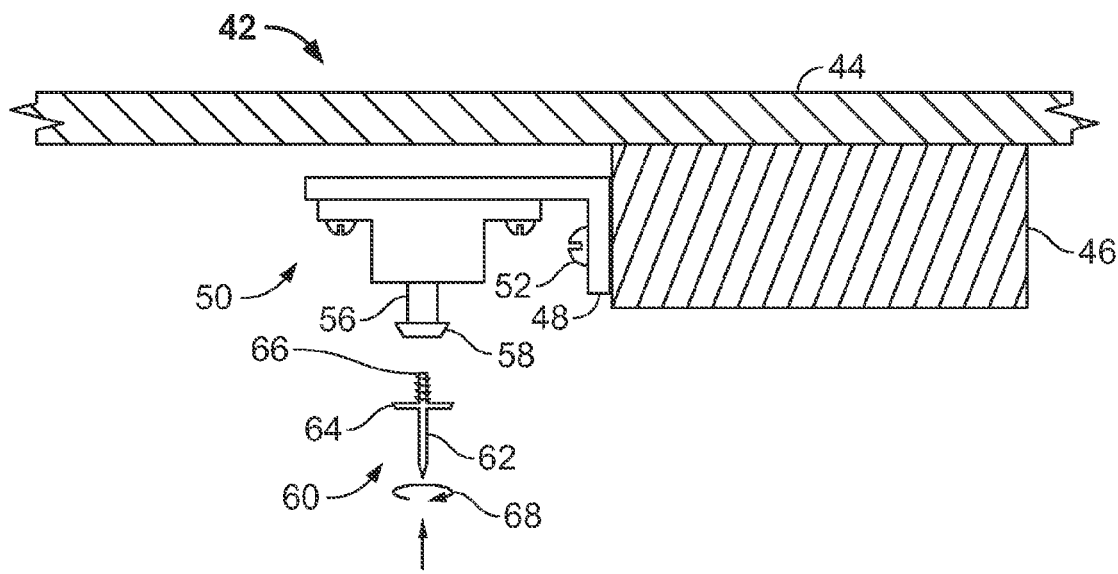
FIG. 4 is a schematic view illustrating the attachment of an alignment spike to the vibration isolator assembly of FIG. 3.

With continuing reference to FIG. 1, at block 24, an alignment spike is attached to protruding engagement portion 56. This step is illustrated in FIG. 4. In FIG. 4, an alignment spike 60 is inserted into the inner diameter of protruding engagement portion 56. Alignment spike 60 has a forward end 62, a flange 64, and a rear portion 66. In the illustrated embodiment, forward end 62 has a relatively sharp end point which, as discussed below, may facilitate the detection of alignment spike 60 through a vibration-deadening body when it is pressed against alignment spike 60. In other embodiments, the end of forward end 62 need not be sharpened, but may be rounded, squared off, or may have any other suitable configuration to facilitate its detection. Flange 64 protrudes outwardly from a central body of alignment spike 60 and serves to protect flange 58 and protruding engagement portion 56 during a subsequent step of method 20, as discussed below. In the illustrated embodiment, rear portion 66 is threaded. This facilitates threaded engagement between rear portion 66 and the inner diameter of the protruding engagement portion 56. As indicated by arrow 68, in the illustrated embodiment, alignment spike 60 is screwed into the protruding engagement portion 56. In other embodiments, rear portion 66 and/or the inner diameter of protruding engagement portion 56 may lack threads. In such embodiments, alignment spike 60 may engage with protruding engagement portion 56 in any suitable manner including, but not limited to, the use of barbs, a snap fit, an interference fit, or any other configuration that is suitable to permit a temporary mounting of alignment spike 60 to protruding engagement portion 56.

Figure 5:
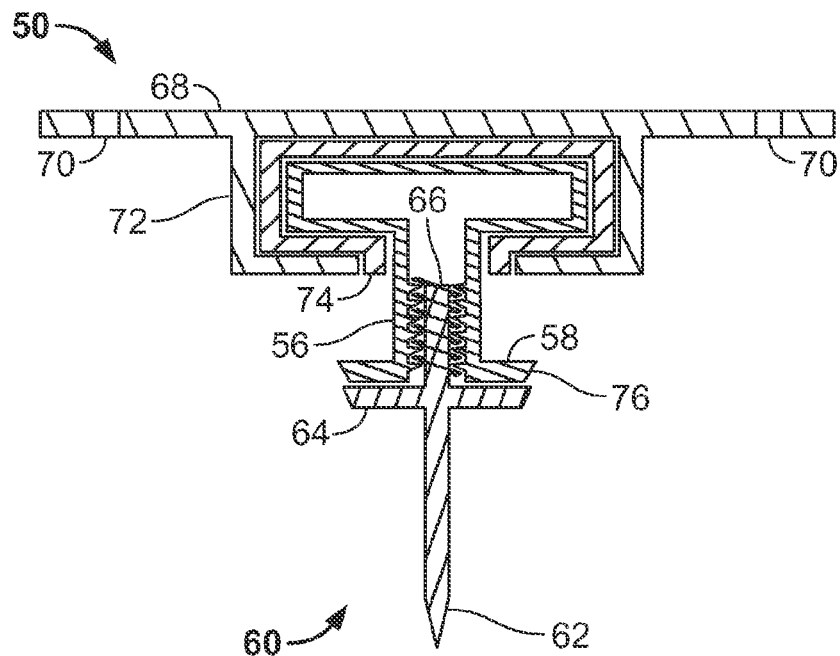
FIG. 5 is a cross-sectional schematic view illustrating the vibration isolator assembly of FIG. 3 and the alignment spike of FIG. 4 assembled thereto.

FIG. 5 is a cross-sectional schematic view illustrating the vibration isolator assembly 50 engaged with alignment spike 60. With continuing reference to FIGS. 1-4, in FIG. 5, the discrete components a vibration isolator assembly 50 are depicted. Vibration isolator assembly 50 includes a base 68. Attachment holes 70 are defined through base 68 and facilitate the mounting of base 68 to fuselage 42. Housing 72 is integrated into base 68 and is configured to house and restrain both an elastomeric envelope 74 and protruding engagement portion 56.

As illustrated in FIG. 5, elastomeric envelope 74 is interposed between housing 72 and protruding engagement portion 56 such that there is no direct contact between housing 72 and protruding engagement portion 56. Accordingly, any and all structure borne vibrations transmitted to housing 72 through base 68 must pass through elastomeric envelope 74 before reaching protruding engagement portion 56. Being comprised of flexible materials, elastomeric envelope 74 is configured to absorb and diminish such vibrations and thus inhibit such vibrations from reaching protruding engagement portion 56.

Flange 58 of protruding engagement portion 56 includes a beveled portion 76. Beveled portion 76 may facilitate engagement of a retaining member with a flange 58 during subsequent step of method 20. In other embodiments, flange 58 may omit beveled portion 76 and may instead include a straight or vertical edge without departing from the teachings of the present disclosure.

As further illustrated in FIG. 5, rear portion 66 is in threaded engagement with the inner diameter of protruding engagement portion 56. This threaded engagement provides for a robust and temporary attachment of alignment spike 60 and vibration isolator assembly 50. As also illustrated in FIG. 5, flange 64 is substantially the same size as flange 58. This provides protection to flange 58 during a subsequent step of method 20 with an opening that is defined in a vibration-deadening body. In other embodiments, flange 64 may be larger than flange 58.

Figure 6:
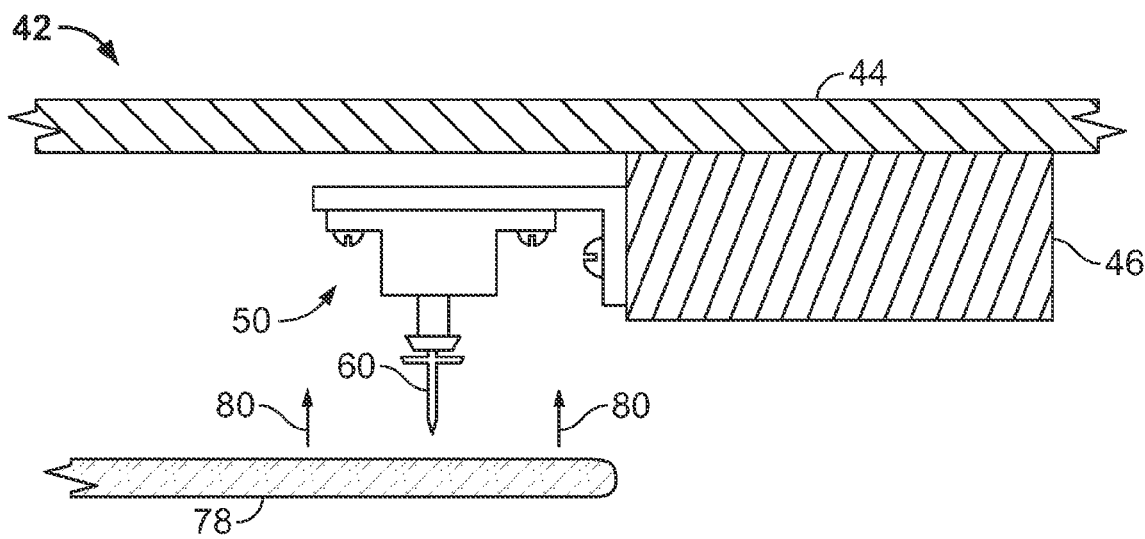
FIG. 6 is a schematic view illustrating the pressing of a vibration-deadening body against the alignment spike.

With reference to FIG. 1, at block 26, a vibration-deadening body is pressed up against the alignment spike. This step is illustrated in FIG. 6. As shown in FIG. 6, a vibration deadening body 78 is pressed up against alignment spike 60 in the direction indicated by arrows 80. In the illustrated embodiment, the vibration-deadening body 78 comprises a sound-deadening blanket. In other embodiments, any other component that is effective to deaden vibrations radiating from outer skin 44 to the cabin of the aircraft may be utilized. In the illustrated embodiment, vibration-deadening body 78 is comprised of sound absorbing and/or sound blocking materials. Accordingly, vibration-deadening body 78 is pliable. Therefore, when vibration-deadening body 78 is pressed up against alignment spike 60, alignment spike 60 will cause a deformation to form on vibration-deadening body 78 that will be detectable from the nearside of vibration-deadening body 78. As used herein, the term "nearside" when used in reference to vibration-deadening body 78 refers to the side of vibration-deadening body 78 that faces away from alignment spike 60 and towards a worker pressing vibration-deadening body 78 against alignment spike 60.

Figure 7:
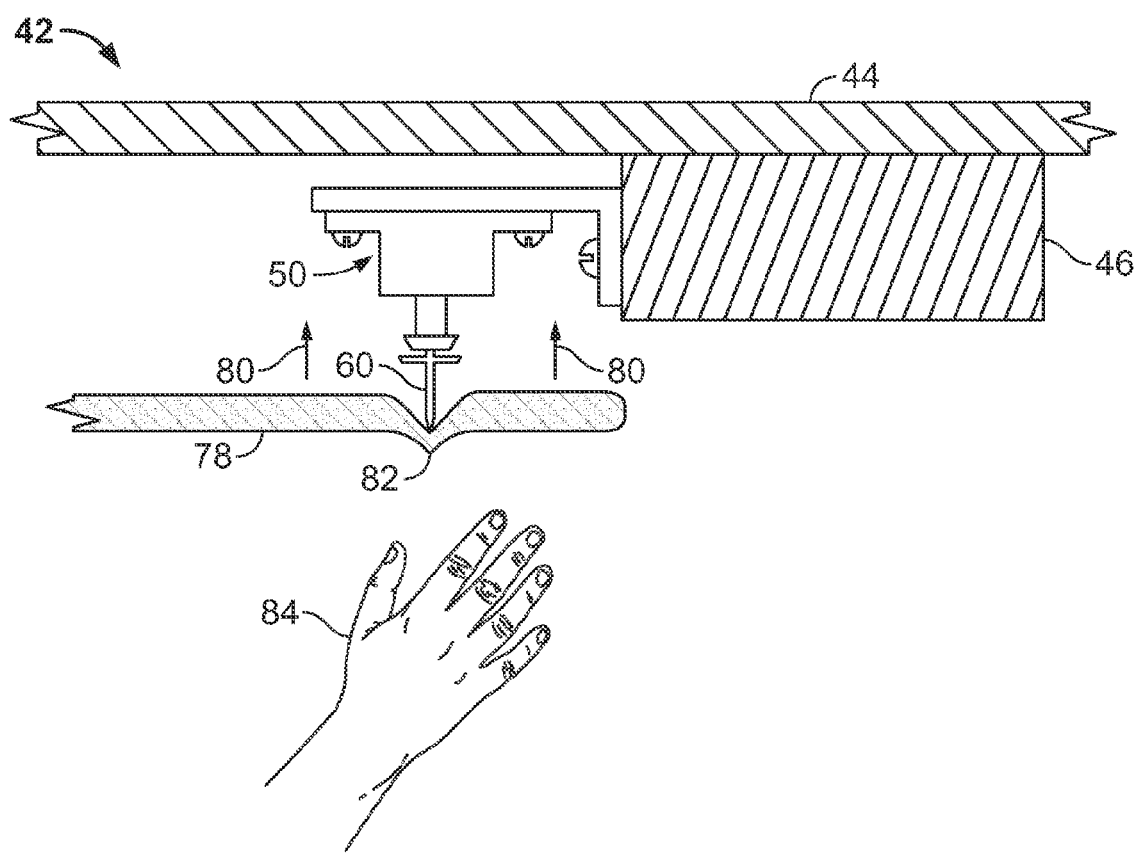
FIG. 7 is a schematic view illustrating the detection of the alignment spike through the vibration-deadening body.

With reference to FIG. 1, at block 28, while pressing the vibration-deadening body against the alignment spike, the location on the vibration-deadening body that corresponds with the position of the alignment spike is detected. This step is illustrated in FIG. 7. In FIG. 7, a deformation 82 is illustrated in the nearside of vibration-deadening body 78. The visibility of deformation 82 will depend, at least in part, on how firmly vibration-deadening body 78 is pressed against the alignment spike 60 and on how soft vibration-deadening body 78 is. In some instances, deformation 82 will be visibly detectable. In other instances, a worker may need to rely on tactile sensation in order to ascertain the location of deformation 82. This latter instance is illustrated in FIG. 7. As shown, a hand 84 belonging to a worker practicing method 20 is illustrated proximate vibration-deadening body 78. To detect the location of deformation 82, hand 84 will be pressed up against the nearside of vibration-deadening body 78 and then moved laterally along the nearside of vibration-deadening body 78 until deformation 82 is detected.

Figure 8:
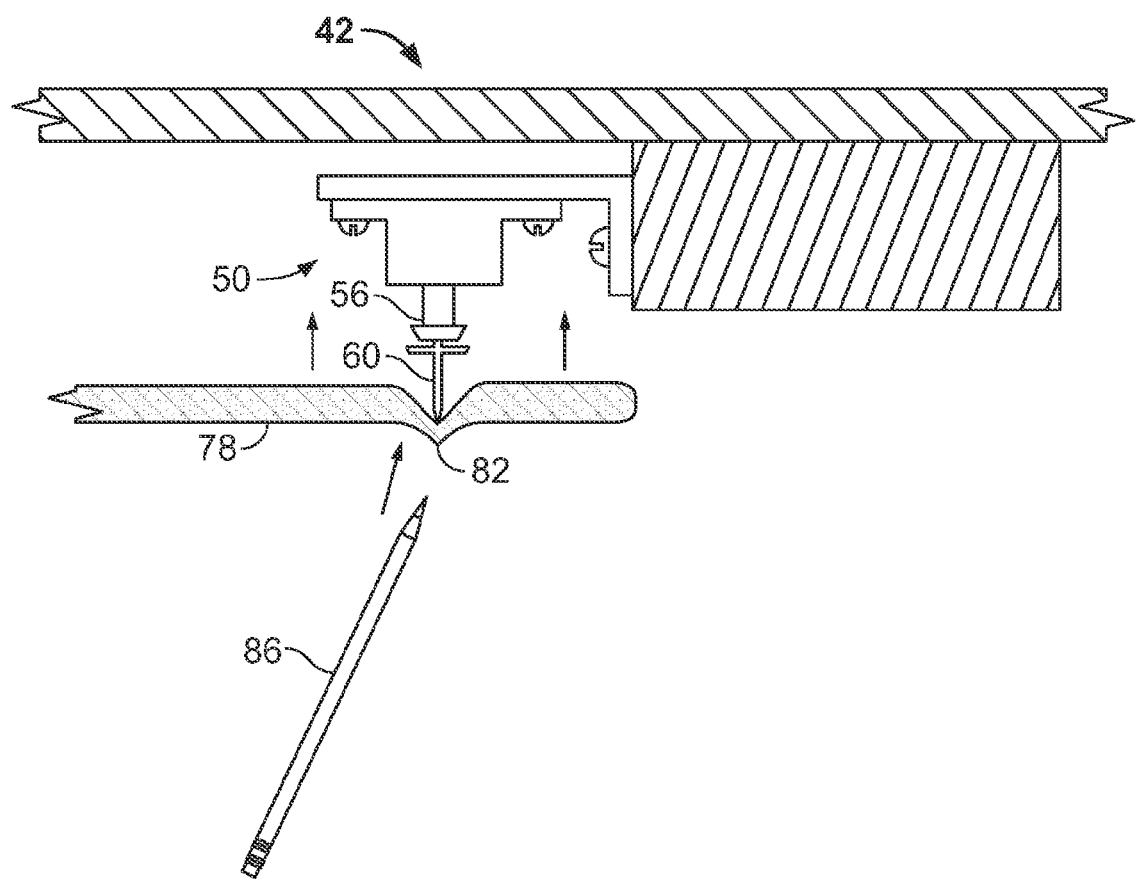
FIG. 8 is a schematic view illustrating the marking of a location on the vibration-deadening body that corresponds with the position of the alignment spike.

With continuing reference to FIG. 1, at block 30, the location corresponding with the position of the alignment spike is marked on the vibration-deadening body. This is illustrated in FIG. 8. In FIG. 8, a pencil 86 is used to mark the location of deformation 82 on vibration-deadening body 78. In other embodiments, any suitable writing implement or other device that is capable of leaving a visibly detectable mark or impression on the nearside of vibration-deadening body 78 may also be used. It will be appreciated by those of ordinary skill in the art that this step is optional. Performance of this step may permit the identification of several locations where openings are needed prior to performing the step of defining/drilling any of the openings.

Figure 9:
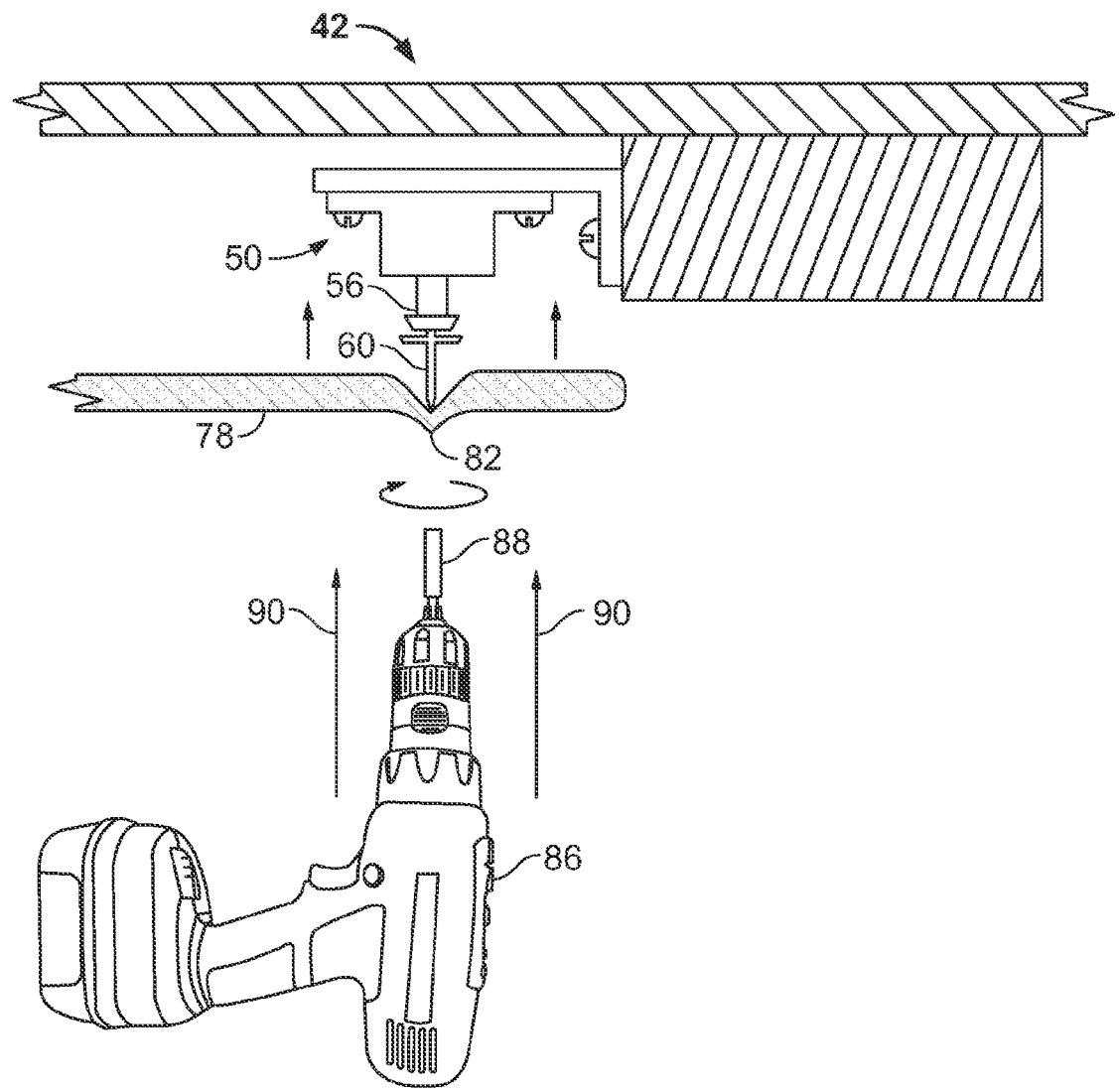
FIG. 9 is a schematic view illustrating the initial stage of drilling an opening in the vibration-deadening body at the location corresponding with the alignment spike.
Figure 10:
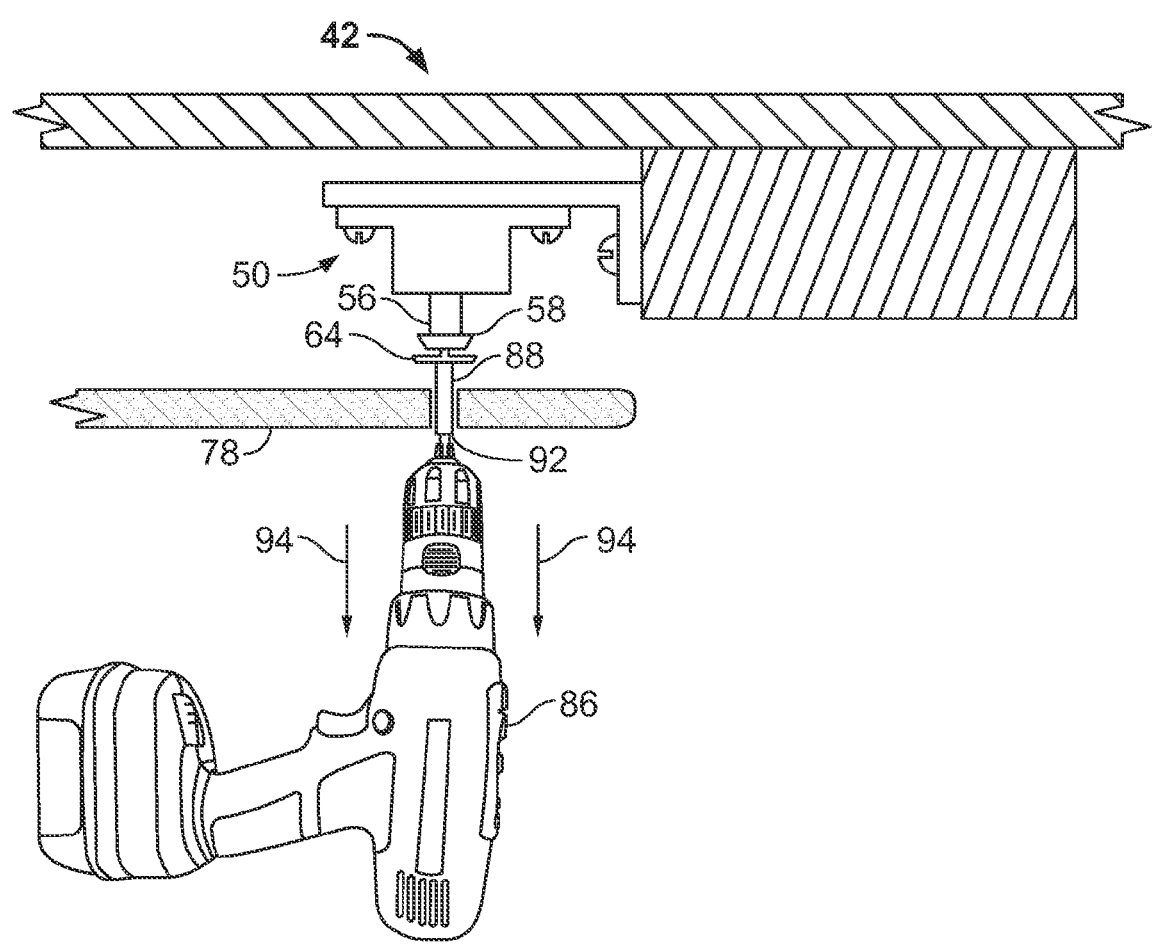
FIG. 10 is a schematically illustrating a final stage of drilling the opening in the vibration-deadening body.

With continuing reference to FIG. 1, at block 32, an opening is defined in the vibration-deadening body at the location corresponding with the position of the alignment spike. This is illustrated in FIGS. 9 and 10. In FIG. 9, a drill 86 is illustrated prior to making contact with vibration-deadening body 78. Drill 86 is equipped with a tubular drill bit 88. Tubular drill bit 88 has a generally cylindrical configuration. Tubular, drill bit 88 has a circular cross-section, a sharpened edge that is configured to cut round holes in a work piece, and a hollow interior to receive alignment spike 60 while drill 86 is defining an opening in the vibration-deadening body 78. A worker desiring to define a hole in vibration-deadening body 78 need only align tubular drill bit 88 with deformation 82, which is facilitated by the marking made at block 30, actuates drill 86 and press into vibration-deadening body 78 in the direction indicated by arrows 90. It will be appreciated by those of ordinary skill in the art that the opening in vibration-deadening body 78 need not be defined by a drill. For example, a razor blade or any other suitable cutting device may alternatively be utilized.

As show in FIG. 10, drill 86 has been pressed completely through the vibration-deadening body 78, thereby creating a circular opening 92 in vibration-deadening body 78. Circular opening 92 has substantially the same diameter as the diameter of protruding engagement portion 56 and will therefore fit snugly around the protruding engagement portion 56.

As illustrated in FIG. 10, tubular drill bit 88 has made physical contact with flange 64. In this manner, flange 64 obstructs tubular drill bit 88 from further upward movement from the perspective of FIG. 10, and therefore inhibits tubular drill bit 88 from having direct physical contact with flange 58 of the protruding engagement portion 56. In this manner, flange 64 shields flange 58 from the cutting-edge of tubular drill bit 88. With continuing reference to FIGS. 1-10, because alignment spike 60 is only temporarily attached to protruding engagement portion 56 and because in some embodiments is anticipated that alignment spike 60 will be disposable, it is preferable that any damage caused by tubular drill bit 88 be incurred by alignment spike 60 rather than by protruding engagement portion 56.

Once circular opening 92 has been defined in vibration-deadening body 78, drill 86 is removed in the direction illustrated by arrows 94.

Figure 11:
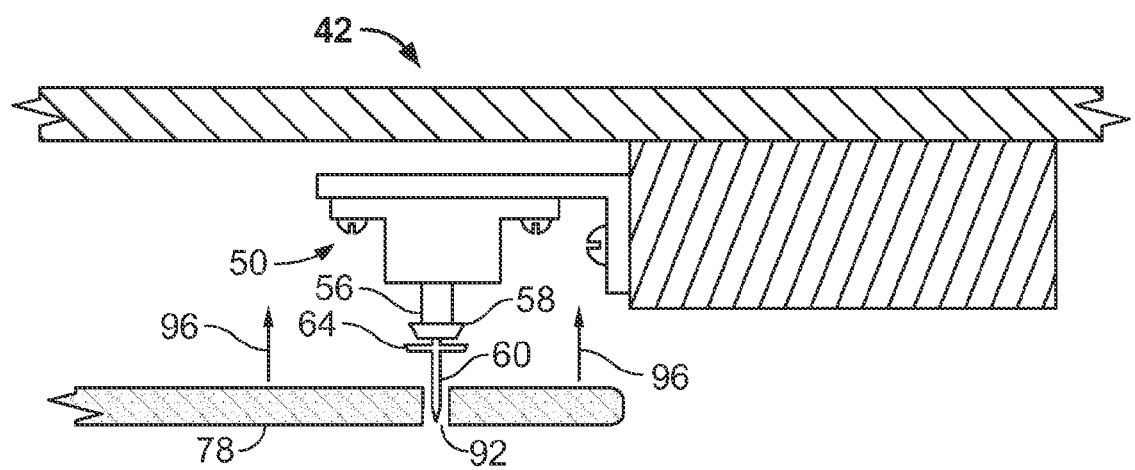
FIG. 11 is a schematic view illustrating the pressing of the vibration-deadening body over the alignment spike and onto a protruding engagement portion of the vibration isolator assembly.
Figure 12:
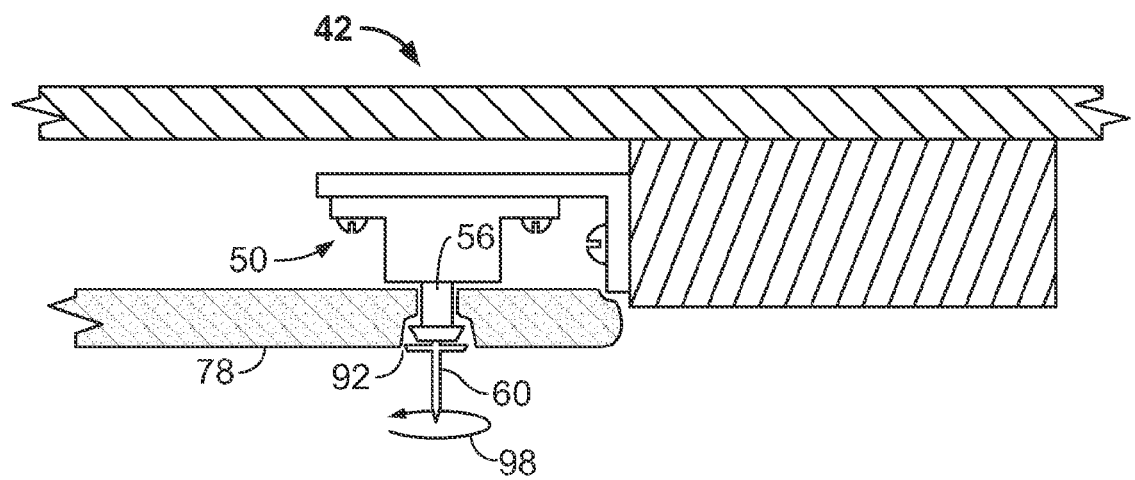
FIG. 12 is a schematic view illustrating the removal of the alignment spike from the protruding engagement portion of the vibration isolator assembly.

With continuing reference to FIG. 1, at block 34, the vibration-deadening body is positioned over the vibration isolator such that the protruding engagement portion is received within the opening. This step is illustrated in FIGS. 11 and 12. With continuing reference to FIGS. 1-10 and specifically with reference to FIG. 11, drill 86 has been removed leaving circular opening 92 clearly visible. Vibration-deadening body 78 is pressed towards vibration isolator assembly 50 in the direction indicated by arrows 96. As illustrated, circular opening 92 is aligned with alignment spike 60 and with protruding engagement portion 56. Accordingly, alignment spike 60 and protruding engagement portion 56 will be received within circular opening 92 as vibration-deadening body 78 is pressed towards vibration isolator assembly 50. With reference to FIG. 12, vibration-deadening body 78 has been pressed up against the vibration isolator assembly 50 and alignment spike 60 and protruding engagement portion 56 are received within circular opening 92.

With continuing reference to FIG. 1, at block 36, the alignment spike is removed from the protruding engagement portion. This step is illustrated in FIG. 12. In FIG. 12, once vibration-deadening body 78 has been seated against vibration isolator assembly 50, alignment spike 60 is unscrewed in the direction indicated by arrow 98 and then removed. In some instances alignment spike 60 may be discarded depending upon the amount of damage alignment spike 60 received from physical contact with tubular drill bit 88.

It should be understood that although the illustrations provided here teach that alignment spike 60 is removed after vibration-deadening body 78 has been seated against vibration isolator assembly 50, in other embodiments, alignment spike 60 may alternatively be removed at other times during the implementation of method 20. For example, alignment spike 60 may be removed immediately following the defining of circular opening 92 and vibration-deadening body 78 and prior to the seating of vibration-deadening body 78 against vibration isolator assembly 50. In still other embodiments, alignment spike 60 may be removed after deformation 82 has been marked and prior to the drilling of circular opening 92 into vibration-deadening body 78. In still other embodiments, alignment spike 60 may be removed after retaining member 100 is installed past flange 58 of protruding engagement portion 56. Thus, in FIG. 1, blocks 36 and 38 may be reversed.

Figure 13:
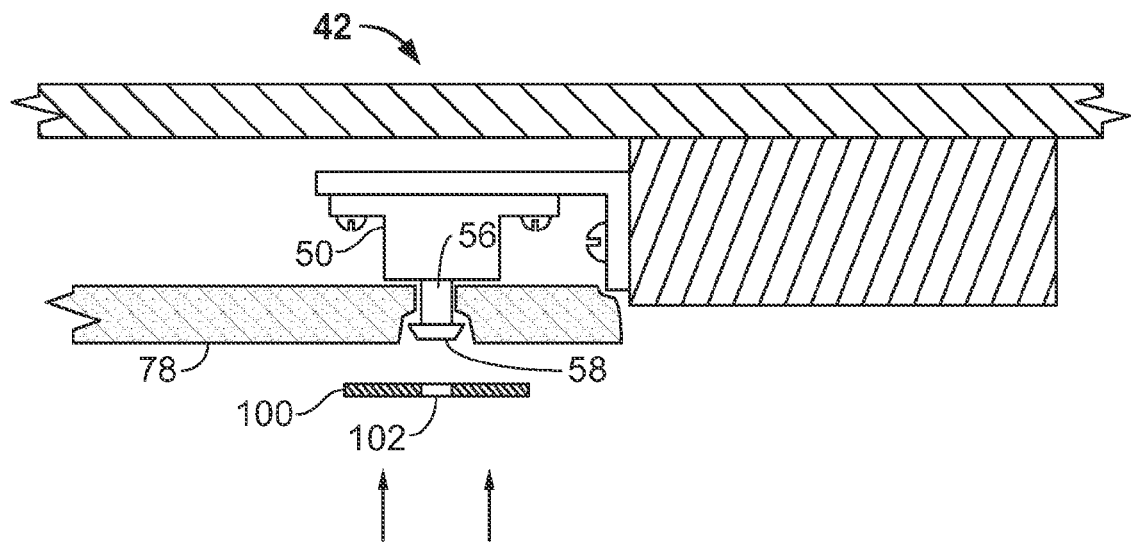
FIG. 13 is a schematic view illustrating an initial stage of pressing a retaining member onto the protruding engagement portion of the vibration isolator assembly with the retaining member illustrated in cross-section.
Figure 14:
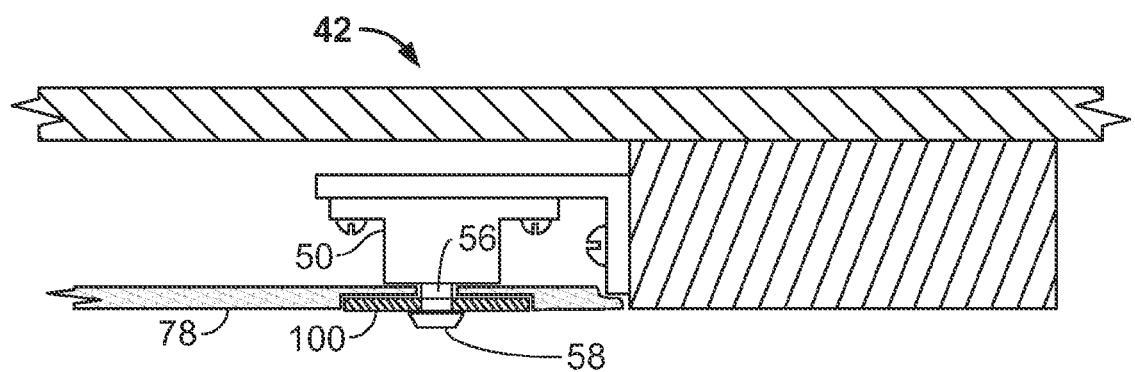
FIG. 14 is a schematic view illustrating the retaining member engaged with a flange of the protruding engagement portion and thereby retaining a portion of the vibration-deadening body in a position spaced apart from an end of the protruding engagement portion.

With continuing reference to FIG. 1, at block 38 a retaining member is pressed onto the protruding engagement portion such that the retaining member will engage the flange of the protruding engagement portion. This step is illustrated in FIGS. 13 and 14. In FIG. 13, a retaining member 100 is illustrated in the cross-section. Retaining member 100 may take any suitable shape and/or configuration. In the illustrated embodiment, retaining member 100 comprises a disc. An opening 102 is defined through retaining member 100. Opening 102 is a circular opening having a diameter that is smaller than the diameter of flange 58 and larger than the diameter of protruding engagement portion 56. The retaining member 100 may be comprised of a flexible material including, but not limited to, metal, polymeric and/or elastomeric materials. Accordingly, retaining member 100 is configured to flex and/or to deform under pressure by an amount sufficient to permit flange 58 to pass through opening 102. With continued reference to FIGS. 1-12, beveled portion 76 facilitates such flexure and deformation of retaining member 100. As set forth above, vibration-deadening body 78 is relatively flexible. Accordingly, when retaining member 100 is pressed against vibration-deadening body 78, vibration-deadening body 78 will deform to accommodate the presence of retaining member 100.

Figure 15:
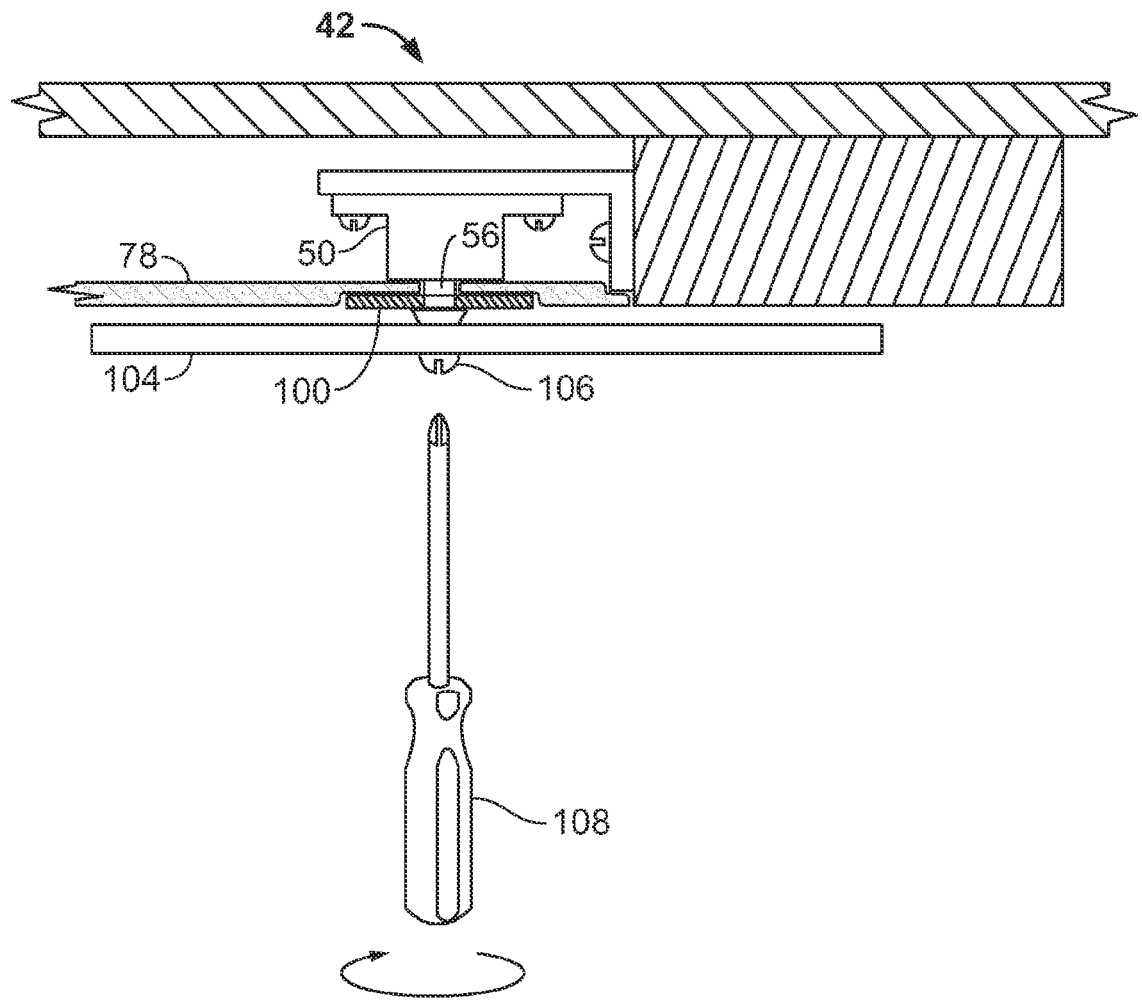
FIG. 15 is a schematic view illustrating the attachment of a component to the protruding engagement portion of the vibration isolator assembly.

FIG. 15 illustrates retaining member 100 after it has been pressed past flange 58 of protruding engagement portion 56. As shown, vibration-deadening body 78 deforms to receive retaining member 100. Retaining member 100 is retained on protruding engagement portion 56 by the obstruction caused by an underside of flange 58. Engagement of retaining member 100 with protruding engagement portion 56 causes retaining member 100 to continuously secure vibration-deadening body 78 in the vicinity of protruding engagement portion 56. As a result, vibration-deadening body 78 is restrained from obstructing the opening to the inner diameter of protruding engagement portion 56.

The arrangement that is depicted in FIG. 14 addresses the two primary drawbacks of the prior art solutions. With continuing reference to FIGS. 1-14, circular opening 92 is sized to fit snugly around the protruding engagement portion 56 and thus provides either no pathway or a very limited pathway for radiated sound from fuselage 42 to reach into the aircraft's cabin. Additionally, the retaining member 100 helps to ensure that the opening to the inner diameter of protruding engagement portion 56 is kept clear of the internal materials of vibration-deadening body 78, thus reducing the likelihood that there will be interference between a threaded fastener and the threads of the inner diameter of protruding engagement portion 56 when a component is attached to vibration isolator assembly 50.

With continuing reference to FIG. 1, at block 40, the component is attached to the protruding engagement portion of a vibration isolator assembly 50. This step is illustrated in FIG. 15. In FIG. 15, a cabin interior component 104 is positioned against protruding engagement portion 56 and is attached thereto via a threaded fastener 106 and a screwdriver 108. In other embodiments, other components may alternatively be secured to protruding engagement portion 56 as desired.

Figure 16:
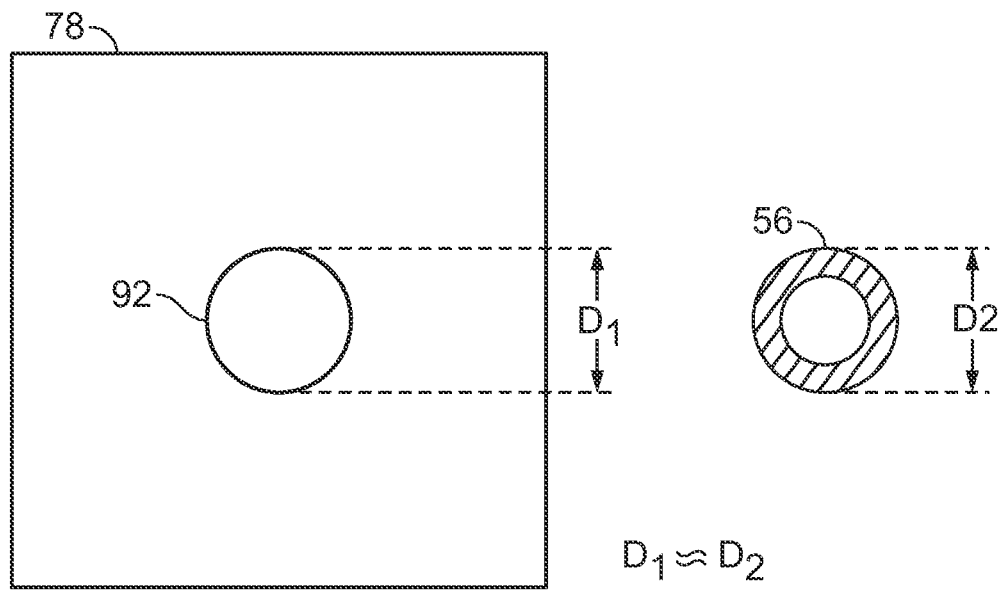
FIG. 16 is a schematic view illustrating an opening defined in a vibration-deadening body and the diameter of the protruding engagement portion in an embodiment where the opening in the vibration-deadening body and a diameter of the protruding engagement portion are substantially equal in size.
Figure 17:
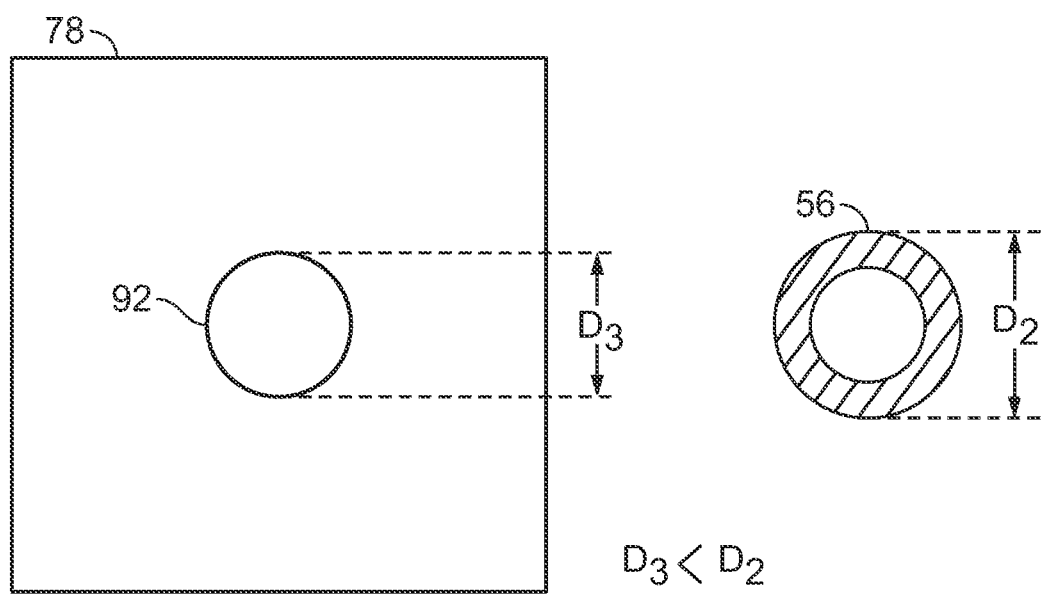
FIG. 17 is a schematic view illustrating an opening defined in a vibration-deadening body and the diameter of the protruding engagement portion in an embodiment where the opening in the vibration-deadening body is smaller than the diameter of the protruding engagement portion.

With reference to FIGS. 16 and 17, and with continuing reference to FIGS. 1-15, the diameter of a tubular drill bit 88 can be manipulated to provide a desired diameter of circular opening 92. In some embodiments, such as that illustrated in FIG. 16, it may be desirable for circular opening 92 to have a diameter $D_1$ that is equal to an outer diameter $D_2$ of protruding engagement portion 56. As stated above, this arrangement provides a good fit between vibration-deadening body 78 and protruding engagement portion 56 and minimizes open space which could otherwise service a pathway for radiated noise from fuselage 42 to the cabin of the aircraft. In such embodiments, a tubular drill bit having an outer diameter that is substantially equal to $D_2$ should be selected to serve as tubular drill bit 88.

In other embodiments, such as that illustrated in FIG. 17, it may be desirable for circular opening 92 to have a diameter $D_3$ that is smaller than the diameter of protruding engagement portion 56 ($D_2$). This configuration is made possible by the fact that vibration-deadening body 78 can be comprised of flexible materials that can be stretched. Such an arrangement would provide a snug or tight fit between vibration-deadening body 78 and protruding engagement portion 56, further minimizing the presence of open space between vibration-deadening body 78 and protruding engagement portion 56 and further reducing the likelihood of sound radiating from fuselage 42 to the aircraft cabin. In such embodiments, a tubular drill bit having an outer diameter that is less than diameter $D_2$ should be selected to serve as tubular drill bit 88.

While at least one exemplary embodiment has been presented in the foregoing summary and detailed description of the disclosure, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for attaching a component to an internal portion of an aircraft fuselage, the method comprising:
   mounting a vibration isolator assembly to the internal portion of the aircraft fuselage, the vibration isolator assembly having a protruding engagement portion having a flange;
   attaching an alignment spike to the protruding engagement portion;
   pressing a vibration-deadening body against the alignment spike;
   detecting a location on a nearside of the vibration-deadening body that corresponds with a position of the alignment spike;
   marking the location with a visible mark;
   defining an opening in the vibration-deadening body by beginning to define the opening with a cutting implement on the nearside of the vibration-deadening body proximate the visible mark and continuing to define the opening until the opening extends through a far side of the vibration-deadening body and until the cutting implement contacts a rear flange of the alignment spike;
   aligning the opening with an end of the protruding engagement portion;
   positioning the vibration-deadening body over the vibration isolator assembly after the opening has been defined and aligned with the end of the protruding engagement portion such that the protruding engagement portion is received within the opening;
   removing the alignment spike;
   pressing a retaining member onto the protruding engagement portion such that the retaining member engages the flange, wherein the retaining member is configured to retain a portion of the vibration-deadening body below an end of the protruding engagement portion; and
   attaching the component to the protruding engagement portion.

2. The method of claim 1,
   wherein the protruding engagement portion comprises an internal threaded engagement surface, and
   wherein the step of attaching the alignment spike to the protruding engagement portion comprises screwing the alignment spike into the protruding engagement portion.

3. The method of claim 1, further comprising detecting a location on the vibration-deadening body that corresponds with a position of the alignment spike while pressing the vibration-deadening body against the alignment spike, and
   wherein the defining comprises defining the opening at the location.

4. The method of claim 3, wherein the detecting comprises feeling for the alignment spike through the vibration-deadening body from a nearside of the vibration-deadening body.

5. The method of claim 3, further comprising marking the location on the vibration-deadening body.

6. The method of claim 3, wherein the defining comprises drilling a hole through the vibration-deadening body.

7. The method of claim 6, wherein the defining further comprises drilling the hole using a tubular drill bit.

8. The method of claim 6, wherein the defining further comprises drilling the hole using a tubular drill bit having a diameter that is substantially equal to a dimension of a periphery of the protruding engagement portion.

9. The method of claim 6, wherein the defining further comprises drilling the hole using a tubular drill bit having a diameter that is less than a dimension of a periphery of the protruding engagement portion.

10. The method of claim 7, wherein the defining further comprises positioning the tubular drill bit at the location and drilling the hole such that the alignment spike is received within the tubular drill bit while drilling the hole with the tubular drill.

11. The method of claim 10, wherein the defining further comprises pushing the tubular drill bit through the vibration-deadening body and onto the alignment spike until contact between the tubular drill bit and a rear flange of the alignment spike.

* * * * *